July 20, 1965 V. L. WHITE ETAL 3,196,353

COMMAND COMMUNICATIONS VOICE CONSOLE

Filed Oct. 19, 1962 3 Sheets-Sheet 1

INVENTORS
VERNON L. WHITE
GEORGE E. McATEE
BY
Ervin F. Johnston
George J. Rubens
ATTORNEYS

COMMAND COMMUNICATIONS VOICE CONSOLE

Filed Oct. 19, 1962 3 Sheets-Sheet 2

NOMENCLATURE

D – DIAL
K – KEYER
MJP – MONITOR JACK PANEL
SPP – SIG. PATCH PANEL
OTS – OPERATOR TELEPHONE SET
R – RINGER
TB – TERMINAL BOARD

INVENTORS
VERNON L. WHITE
GEORGE E. McATEE
BY
Ervin F. Johnston
George J. Rubens
ATTORNEYS

COMMAND COMMUNICATIONS VOICE CONSOLE

Filed Oct. 19, 1962 3 Sheets-Sheet 3

INVENTORS
VERNON L. WHITE
GEORGE E. McATEE
BY
Ervin A. Johnston
George J. Rubens
ATTORNEYS United States Patent Office 3,196,353

Patented July 20, 1965

3,196,353

COMMAND COMMUNICATIONS VOICE CONSOLE

Vernon L. White and George E. McAtee, Oxnard, Calif., assignors to the United States of America as represented by the Secretary of the Navy Filed Oct. 19, 1962, Ser. No. 231,874

4 Claims. (Cl. 325—53)

(Granted under Title 35, U.S. Code (1952), sec. 266)

The invention described herein may be manufactured and used by or for the Government of the United States of America for governmental purposes without the payment of any royalties thereon or therefor.

This invention relates to a universal command communications console and more particularly to a communications console which is quickly and easily adaptable for use in a communications system in which any combination of various types of station outlets are tied thereto.

In the past communications consoles have been designed for use only with a predetermined tying arrangement with various types of station outlets. While this design has been satisfactory where the tying arrangement between the station outlets and the communications console does not change, it is entirely unsatisfactory where it is not known ahead of time what type of station outlet will be tied to a particular channel of the console or where the operational requirements demand that the type of station outlet over a particular channel be changed. When these conditions occur the only solution has been to rewire the circuitry and the components within the console for the new arrangement of station outlets. This procedure is expensive and time consuming and results in a material lessening of operational capability. The present invention overcomes these difficulties by providing a communications console which is adapted for use with any arrangement of various types of station outlets that may be tied to the console so that the console can be taken to a location where the types of station oulets are previously unknown and can be tied thereto for immediate use or can be immediately changed over should the type of station outlet over any channel be changed. This is accomplished by packaging the components which are specific to each type of station outlet into a separate plug-in module and providing a jack for each channel of the console which will receive any one of the various types of modules. Accordingly, any channel can then be adapted for use with any type of station outlet by plugging the module that has the specific components corresponding to the station outlet into the jack. Should the console be intended for a location where the tying arrangement of the station outlets to the console are unknown the communications between the console and the station outlets can be immediately established by tying all of the various types of station outlets to a respective channel and then corresponding the modules with respect thereto. Further, should any station outlet on a particular channel be changed to another type, then communications is effected immediately therewith by changing to a new module corresponding to the new type of station outlet. The remainder of the circuitry within the console is substantially common for use with all of the station outlets regardless of their type and is operably connected to the station outlets through the specific components in the various modules. A further advantage of the present invention is that 95% of the components that are subject to failure are built into the plug-in modules so that when a failure occurs therein communications with the console can be restored within a minimum of time by merely removing the defective module and replacing it with another like module.

An object of the present invention is to provide a command communications console which is adaptable for use within a minimum of time with any tying arrangement of various types of station outlets thereto.

Another object is to provide a command communications console which can be moved to different communication areas and be employed without substantial alteration for use with various types of station outlets regardless of the tying arrangement of the station outlets to the communications console.

A further object of the invention is to provide a command communications console which can be adapted within a minimum of time for communications over a channel in which the station outlet tied thereto has been changed to another type of station outlet.

Still another object is to provide a command communications console in which a majority of the type of failures of components therein can be changed within a minimum of time.

A still further object of the present invention is to provide a communications system in which communications can be maintained between a console and various types of station outlets regardless of the rearrangement of the tying of the station outlets to the console through the console's channels.

Other objects and many of the attendant advantages of this invention will be readily appreciated as the same becomes better understood by reference to the following detailed description when considered in connection with the accompanying drawings in which like reference numerals designate a like part throughout the figures thereof and wherein.

Figure 1:
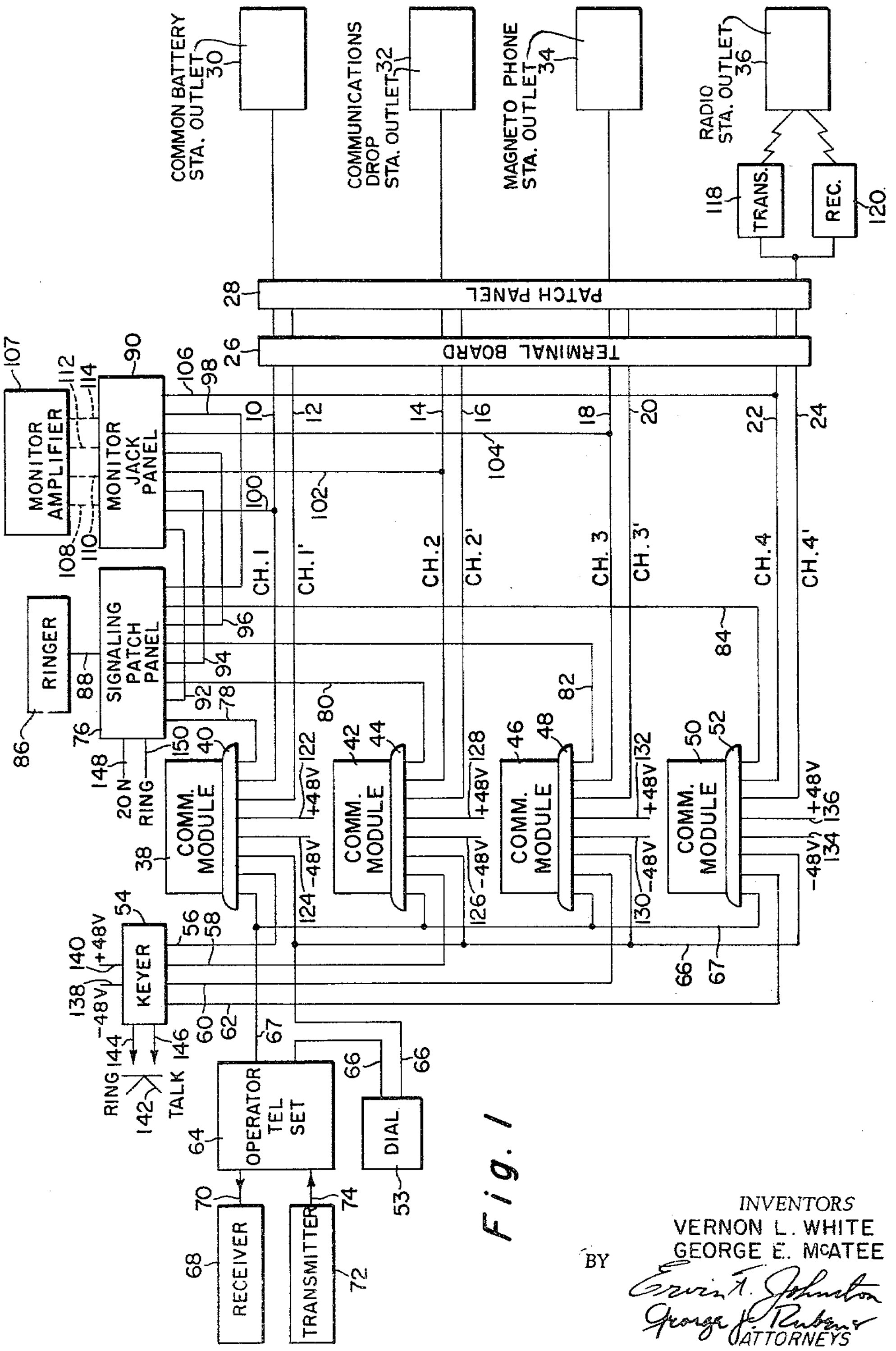
FIG. 1 shows a block diagram of a communications console tied to a plurality of various types of station outlets.

Referring now to the drawings, wherein like reference numerals designate like or corresponding parts throughout the several views there is shown in FIG. 1 a command communications console (all that to the left of the patch panel 28) having a plurality of signal information conducting channels which are: channels 1 and 1' corresponding to lines 10 and 12 respectively, channels 2 and 2' corresponding to lines 14 and 16 respectively, channels 3 and 3' corresponding to lines 18 and 20 respectively, and channels 4 and 4' corresponding to lines 22 and 24 respectively. The channels are tied via a terminal board 26 and a patch panel 28 to various types of station outlets, channel 1 being tied to a common battery station outlet 30 which employs the same power as the console or the receivers and transmitters thereof, channel 2 being tied to a communications drop station outlet 32 which employs its own power for its transmitter and receiver, channel 3 being tied to a magneto phone station outlet 34 and channel 4' being tied via a transmitter 118 and receiver 120 to a radio station outlet 36. The channels that are marked with a prime designation are connected to the terminal board 26 for operation only with the radio type of station outlet, and the channels having no prime designation are connected to the terminal board 26 for use with any of the other type of station outlets. Communications drop station outlet 32 is a general term used to refer to a terminus in a communications system such as at a point where a customer's instrument may be attached for use in the system. Common battery station outlet 30 referes to a station or terminus which utilizes the same power source as the command or control station.

Each of the channels are connected to a respective communication module via a jack, the channels 1 and 1' being connected to a communication module 38 via a jack 40, the channels 2 and 2' being connected to a communication module 42 via a jack 44, the channels 3 and 3' being connected to a communication module 46 via a jack 48 and the channels 4 and 4' being connected to a communication module 50 via a jack 52. Each of the communication modules represent components and circuitry which is specific to the station outlet to which it is connected. Accordingly, the module 38 includes all of the components which are specifically used only with the common battery type of station outlet since that type of station outlet is connected thereto. The other modules likewise include all of the specific components corresponding to the type of station outlet to which it is connected with the exception of the module 42 which includes a dial 53, the dial being specific to the communications drop type of station outlet. Dial 53 refers to a common telephone dialing device and although it is connected to all station outlets, it can only be used with those stations which have a module which will accept the dial fittings. Each of the communication modules completes the circuit between components which are common to all of the station outlets and the station outlets themselves. These components which are common to all of the station outlets, regardless of type, include a keyer 54 connected to each of the jacks via lines 56, 58, 60 and 62, an operator's telephone set 64 connected to each of the jacks via lines 66 and 67, a receiver 68 connected to the operator's telephone set 64 via a line 70, a transmitter 72 connected to the operator telephone set 64 via a line 74, a signaling patch panel 76 connected to each of the jacks via lines 78, 80, 82 and 84, and a ringer 86 connected to the signaling patch panel 76 via a line 88 for use with any of the station outlets upon proper patching of the signaling patch panel 76. Another component used commonly with all the station outlets is a monitor jack panel 90 connected to the signaling patch panel 76 via lines 92, 94, 96, and 98, each of these latter four lines being adapted for use with a respective one of the channels upon proper patching of the signaling patch panel 76, and the monitor jack panel 90 further being connected via lines 100, 102, 104 and 106 to lines 10, 14, 18, and 22, respectively for completing the function of the monitor jack panel 90 with the respective channels. Dial 53, operator's telephone set 64, receiver 68 and transmitter 72 comprise the central command station of the command console. A monitor amplifier 107 is adapted for connection with the monitor jack panel 90 via lines 108, 110, 112, and 114, these latter lines being adapted for plugging into the monitor jack panel 90 for providing specific listening posts of the station outlets (except the radio type of station outlet) for an operator of the console. The dial 53 is interposed in the line 66 for employment over any one of the channels which employs a communications drop type of station outlet. Channel 4' is shown patched via the patch panel 28 to a transmitter 118 and a receiver 120 for communications over the air with the station outlet 36. Each line for a channel having a prime designation has four wires with one pair adapted to be connected to the receiver 120. Each line for the channels that do not have a prime designation have two wires for use with all the station outlets except the radio type of station outlet. Power is fed into the communications modules for performing relay functions therein by various leads, the leads 122 and 124 furnishing via the jack 40 +48 volts and −48 volts respectively into the communication module 38, the leads 126 and 128 furnishing via the jack 44 −48 volts and +48 volts respectively to the communications module 42, the leads 130 and 132 furnishing via the jack 48 −48 volts and +48 volts to the communications module 46 and the leads 134 and 136 furnishing via the jack 52 −48 volts and +48 volts respectively to the communications module 50. Power is furnished to the keyer 54 via lines 138 and 140 receiving −48 volts and +48 volts respectively. A rockable key 142 operates with the keyer 54 and performs ringing functions when it is pushed for connection with a lead 144 and for talking keying functions when it is pushed for connection with a lead 146. When the key 142 is connected to the lead 144 a +48 volts is fed from line 138 to one wire within line 56 for ringing purposes and when connected to the lead 146 the +48 volts is fed to another wire within line 56 for talking purposes. When the key 142 is in a neutral position, as shown in FIG. 1, no voltage is applied to either of the wires within line 56.

Figure 2:
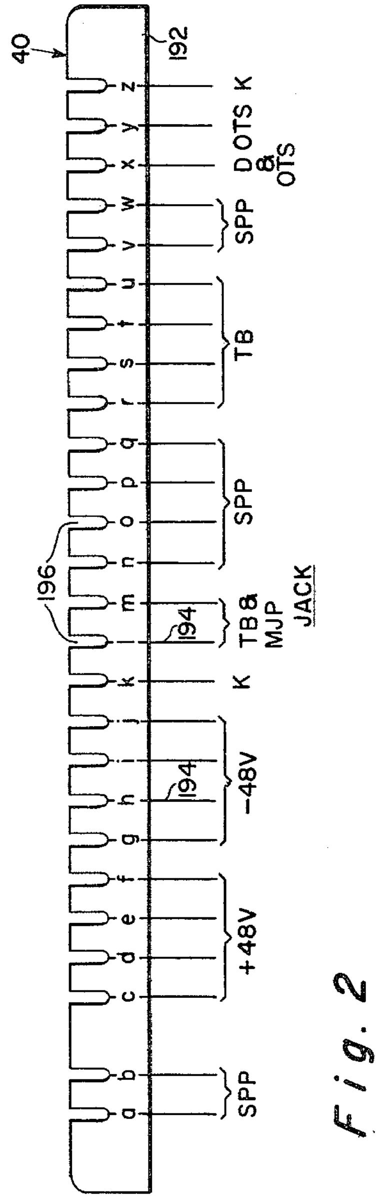
FIG. 2 shows a schematic view of a jack which is adapted to receive any one of the plug-in modules.

In FIG. 2 there is shown the jack 40 (also shown in FIG. 1) which is identical to jacks 44, 48 and 52, this jack having a base portion 192 which connects wires 194 to female connectors 196. The jack 40 is adapted to receive any one of the plug-in modules shown in FIGS. 3, 4, and 5 by plugging the male connectors 198 of any one of these modules into the female connectors 196. For reference purposes small letter designations are used to refer to the wires 194, as well as the female connectors 196 of the jack 40. Further, the letter designations are also used to refer to the male connectors 198 and the wires opposite thereof for each of the modules shown in FIGS. 3, 4 and 5. The following table corresponds the wires 194 shown in FIG. 2 with the lines from the jack 40 shown in FIG. 1 (along with the components with which these lines and wires operate):

| Lines in Fig. 1 | Wires in Fig. 2 | Operative Components |
|---|---|---|
| 67 | *y* | OTS. |
| 66 | *x* | D and OTS. |
| 56 | *k* and *z* | K. |
| 122 | *c*, *d*, *e* and *f* | +48 volts. |
| 124 | *g*, *h*, *i*, *j* | −48 volts. |
| 12 (radio end site) | *r*, *s*, *t*, *u* | TB. |
| 10 (all other endsites) | *l*, m | TB and MJP. |
| 78 | *a*, *b*, *n*, *o*, *p*, *q*, *v* and *w*. | SPP. |

It is to be noted that the jack 40 is polarized by the extra space between the female connectors *b* and *c*.

Figure 3:
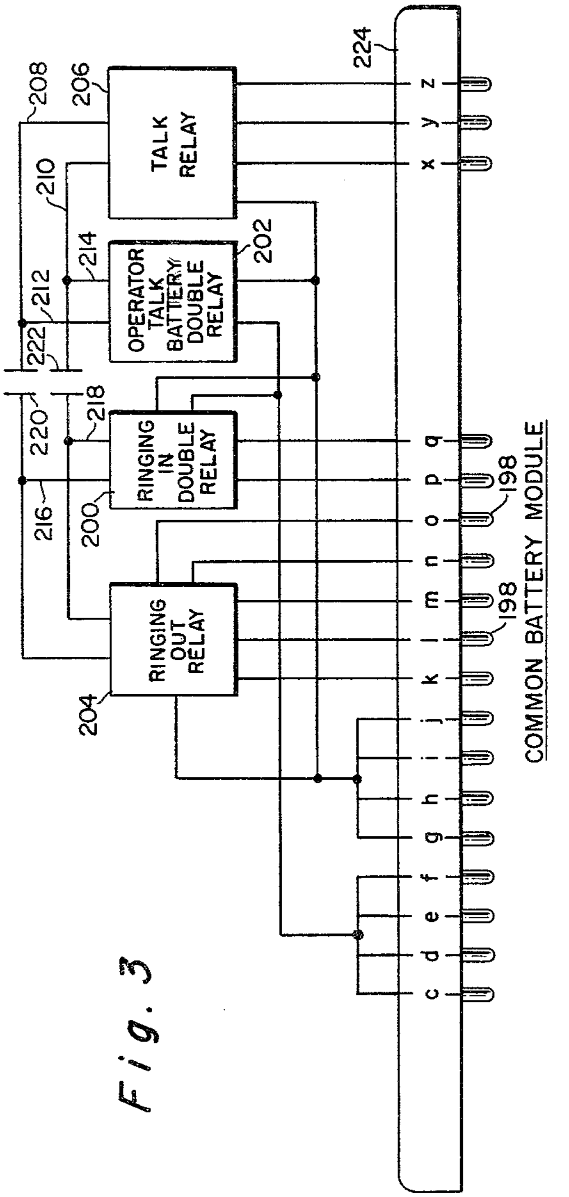
FIG. 3 is a schematic view of a plug-in module having components for use only with a common battery type of station outlet.

The common battery module, shown in FIG. 3, has specific components which are usable only with a common battery type station outlet. The common battery type of end site has no power of its own but relies entirely upon the power furnished by the console. This type of station outlet can use either a hand phone which is used for calling up on the line when it is taken off of a hook or a hand set which is used for calling up on the line by plugging into a jack at the station location. In FIG. 3 the wires *c*, *d*, *e*, and *f* apply a +48 volts potential to a double soleniod of a ringing in double relay 200 and also to a double solenoid of operator's talk battery relay 202. Wires *g*, *h*, *i*, and *j* apply a −48 volts potential to a solenoid of a ringing out relay 204, to the double solenoid of the ringing-in double relay 200, to the double solenoid of the operator's talk battery double relay 202, and to a solenoid of a talk relay 206. Wire *k* which goes to the keyer 54 within the console completes the circuit of the solenoid of the ringing-out relay 204, and wire *z* which also goes to the keyer 54 within the console completes the circuit to the solenoid of the talk relay 206. When the console operator desires to talk to the station operator he will push the key 142 to the ring position. Wire *k* will then pick a +48 volt potential from the keyer 54 and apply it to the solenoid of the ringing-out relay 204, thereby completing the circuit to this solenoid. This causes the relay to actuate so as to close contacts therein. These contacts connect wires *n* and *o* with wires *l* and *m*, the wires *n* and *o* drawing the 20 cycle ringing power from the signaling patch panel 76. As shown by the table wires *l* and *m* represent channel 1 and go to the station 30 via the terminal board 26 and the patch panel 28. Upon the connection of the wires $n$ and $o$ with wires $l$ and $m$ the 20 cycle ringing power is impressed upon a ringer at the station outlet and apprises the station operator that he has a call from the console operator. After the console operator has made the ring to the station outlet he will then push the key 142 to the talk position which will terminate the application of +48 volts to line $k$ and break the connection between the wires $n$ and $o$ to the wires $l$ and $m$, thereby stopping the ring at the station outlet. When the key 142 is pushed to the talk position wire $z$ completes the circuit to the solenoid within the talk relay 206 (by applying +48 volts thereto) so as to close contacts therein and connect wires $x$ and $y$ with wires $l$ and $m$, the wires $x$ and $y$ going to the operator's telephone set 64 and the wires $l$ and $m$ going to the station outlet 30. This connection is made between the talk relay 206 and the ringing-out relay 204 via wires 208 and 210. When the contacts in the talk-relay 206 are closed the +48 volt potential and the −48 volt potential applied to the operator's talk battery relay 202 are applied via wires 212 and 214, thence wires 208 and 210 to lines $x$ and $y$, so as to supply the console operator's microphones with talk battery power. After the station operator comes up on the line by taking his hand set off of the hook the console operator and the station operator communicate with one another by the connection of wires $l$ and $m$ with wires $x$ and $y$, the former pair going to the station outlet 30 and the latter pair going to the operator telephone set 64 in the console as stated before. Should the station operator desire to call the console operator he would merely pick up his hand set which would lift his hook and place a short at the station outlet across the double solenoid of the ringing-in double relay 200, this short being accomplished across wires $l$ and $m$, thence via normally closed contacts in the ringing-out relay 204 to wires 208 and 210 and then through wires 216 and 218 to the double solenoid in the ringing-in relay 200. The shorting of the double solenoid in the ringing-in relay 200 actuates this relay and closes contacts therein which connect wires $p$ and $q$ so as to apply the 20 cycle ringing power at the signaling patch panel 76 to the ringer 86. When the console operator hears the ringing at his console he will push the key 142 to the talk position which will establish communications with the station operator in the same manner as hereinbefore described, with the energization of the talk relay 206 breaking the circuit that energizes the ringing-in relay 200 and causing the ringer 86 to cease ringing. Capacitors 220 and 222 are employed in the wires 208 and 210 respectively to prevent the talk battery of −48 volts and +48 volts from being applied to the talk wires $l$ and $m$. Accordingly, the power from the relay 202 over wires 212 and 214 will then be applied only to the console operator's head set. All of the wires of the common battery module are connected to the male connectors 198 within a base member 224.

Figure 4:
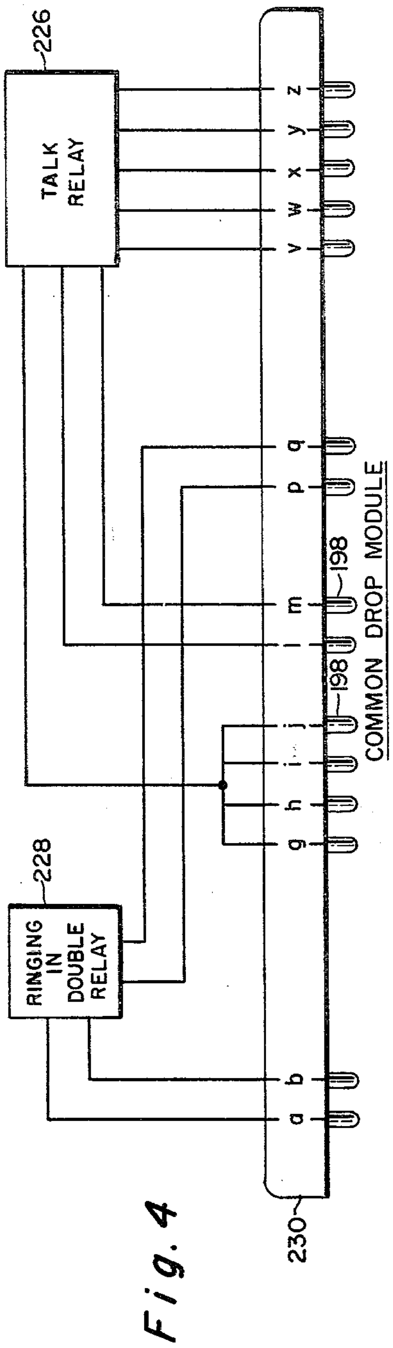
FIG. 4 is a schematic view of a plug-in module which has components for use only with a communications drop type of station outlet.

The communications drop module as shown in FIG. 4 has specific components usable only with the communications drop type of station outlet. The communications drop arrangement is simply for use with the ordinary telephone type of circuit where dialing is performed, this dialing being effected at the console to a communications drop type of station outlet through the dial 53 and the dialing from the station outlet to the console being effected by a dial at the station outlet. In FIG. 4 a −48 volt potential is fed to a solenoid within a talk relay 226 via wires $g$, $h$, $i$ and $j$ and the circuit is completed to this solenoid by the wire $z$ when the console operator pushes the key 142 to the talk position. When the console operator desires to call a communications drop type of station outlet he will push the key 142 to the talk position which causes the wire $z$ to feed a +48 volt potential from the keyer 54 to the solenoid of the talk relay 226, thereby completing the circuit to this solenoid. This will close contacts within the relay which connect wires $x$ and $y$ with wires $l$ and $m$, the wires $x$ and $y$ going to the operator's telephone set 64 and the wires $l$ and $m$ going to the station outlet 32 via a communications central (not shown). The console operator will then dial the number of the station outlet over the dial 53 which impresses a signal on wires $x$ and $y$ and thence wires $l$ and $m$, this signal being processed by the communications central and causing a ringer at the station outlet to ring. When the station operator hears the ring he will pick up his phone which brings the station operator up on wires $l$ and $m$ for communications with the console operator through wires $x$ and $y$. Should the station operator desire to call the console operator he will dial the console operator's telephone number which will be processed by the communications central to connect the station operator to wires $l$ and $m$. Wires $l$ and $m$ are connected with wires $v$ and $w$ via contacts in the talk relay 226 when the solenoid therein is in the deenergized state, the wires $v$ and $w$ going to the signaling patch panel 76. The signaling patch panel 76 is patched to connect wires $v$ and $w$ with wires $a$ and $b$, the wires $a$ and $b$ going to a solenoid within a ringing-in double relay 228. The energy applied to this solenoid closes contacts therein which connect wires $p$ and $q$ to one another. When wires $p$ and $q$ are connected together the 20 cycle ringing power at the signaling patch panel 76 is applied to the ringer 86 causing the ringer 86 to ring and notify the console operator that he has a call from a station outlet. The console operator then pushes the key 142 to the talk position which energizes the solenoid within the talk relay 226 as previously discussed. Upon the solenoid within the talk relay 226 being energized the contacts therein break the connection between the wires $l$ and $m$ with the wires $v$ and $w$ thereby deenergizing the solenoid in the ringing-in double relay 228 and terminating the ring on the ringer 86. At the same time wires $l$ and $m$ are connected via contacts in the talk relay 226 to wires $x$ and $y$, thereby establishing voice communications between the station outlet 32 and the console. Like all the communication modules the communications drop module has a base member 230 which connects the male connectors 198 to the wires opposite thereof.

Figure 5:
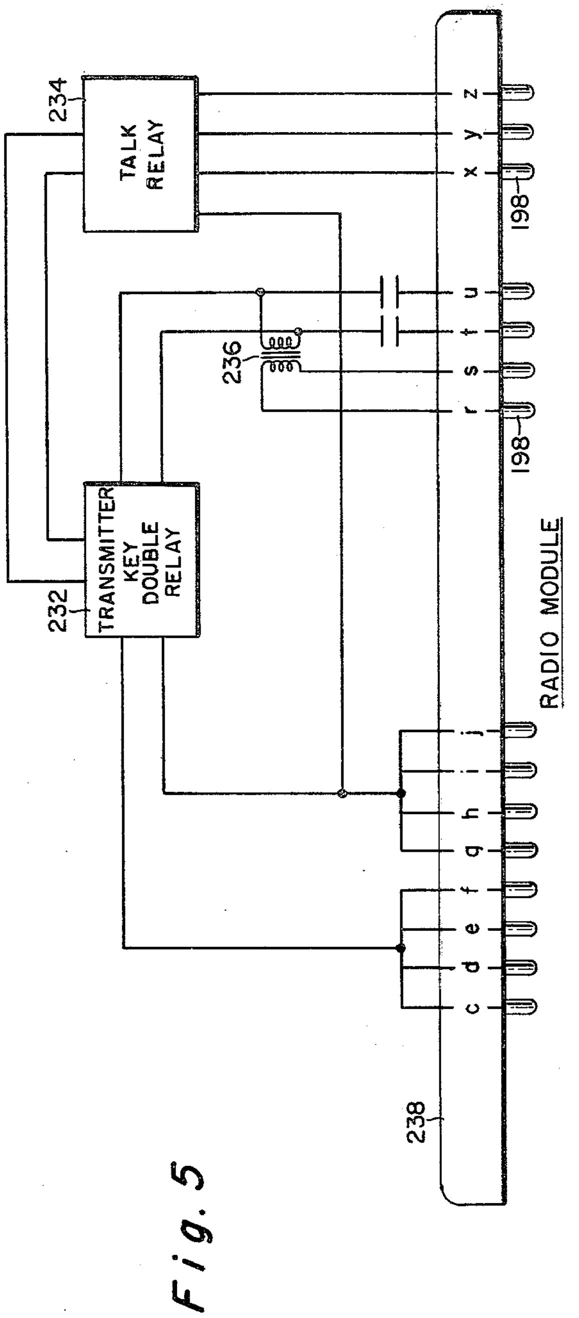
FIG. 5 is a schematic view of a plug-in module having components for use only with a radio type of station outlet.

The radio module, shown in FIG. 5, is usable only with a radio type of station outlet in which the console and the station outlet communicate with one another over the air via receivers and transmitters. In FIG. 5 the wires $r$ and $s$ go to the transmitter 118 and the wires $t$ and $u$ go to the receiver 120, thereby enabling the console operator to talk to the station outlet 36 over wires $r$ and $s$ and listen to talk from the station outlet over wires $t$ and $u$. Wires $c$, $d$, $e$ and $f$ deliver a +48 volts to a double solenoid within the transmitter key double relay 232 and the wires $g$, $h$, $i$ and $j$ deliver a −48 voltage potential to the other side of the double solenoid in the relay 232 as well as to solenoid within a talk relay 234. The wire $z$ completes the circuit with the solenoid within the talk relay 234 when the key 142 is pressed. The wires $r$ and $s$ are tied to the wires $t$ and $u$ via a transformer 235. Should the station operator desire to talk to the console operator he will make his call up on a station outlet transmitter which call up is received by the receiver 120. This call up comes in on wires $t$ and $u$ and is picked up on the monitor amplifier 107 via the monitor jack panel 90. The console operator upon hearing the call up on the monitor amplifier 107 will press the key 142 to the talk position thereby completing the circuit of the solenoid within the talk relay 234. This will then connect wires $x$ and $y$ to the wires, $r$, $s$ and $t$, $u$ via contacts within the talk relay 234 so that the console operator may send his transmission over the transmitter 118 to the station operator or receive over the receiver 120 from the station operator. The console operator then utilizes a microphone (not shown) having a button, the button when pressed keying the transmitter 118. During transmitting or receiving at the console the transmitter key double relay 232 remains energized, thus connecting the wires *r, s, t* and *u* to the wires *x* and *y* so that the button on the microphone is left to select either the transmitting or receiving mode via the keying operation at the transmitter 118. Like the other communication modules the radio module has a base member 238 which connects the male connectors 198 to the wires opposite thereof.

It is to be noted that the various types of station outlets mentioned herein are merely given as examples and accordingly many other types of station outlets can be adapted to the invention by separating the components that are specific to each station outlet and packaging them such that they can be inserted into the jacks 40, 44, 48 or 52.

In the operation of the device the console operator need merely insert the communications module within the jack which corresponds to the station outlet on the particular channel. Should the operator desire to change the station outlet to a different type he will patch into the new type via the patch panel 28 and then change the communication module to a type corresponding to the new type of station outlet. By arranging the components which are specific to respective station outlets within separate plug-in modules the communication console is now made a versatile piece of communication gear so that regardless of the various combinations of types of station outlets connected to the console, the console can be readied for communication with the station outlets without any delay.

Obviously many modifications and variations of the present invention are possible in the light of the above teachings. It is therefore to be understood, that within the scope of the appended claims, the invention may be practiced otherwise than as specifically described.

We claim:

1. A command communications console adapted to establish communications between a plurailty of station outlets having various types of fittings comprising:

a central command station including at least one communication component common to and adapted to be connected to all of said types of station outlets;

a plurality of channels for conducting signal information between said central station and said plurality of station outlets;

terminal means for connecting any one of the various station outlets to a respective channel;

at least one other communication component specific to each type of station outlet;

each specific component adapted to be connected to only one respective type of station outlet;

each of said specific components being packaged into a separate communication module; and a plurality of module receiving means each of which receives only one module and connects said common component to a respective channel via said one module;

each of said module receiving means being capable of receiving any one of said modules;

whereby communications can be effected between any arrangement of various types of station outlets connected to the channels by selectively arranging the separate communication modules in their respective module receiving means corresponding to the station outlets.

2. The device as defined in claim 1 wherein each of said module receiving means includes a connector having male and female portions;

one of said portions being operably connected to a specific component and the other portion being operably connected to a respective channel and the common component.

3. The device as defined in claim 1 wherein there is a plurality of common components which include;

a transmitter-receiver at the central station for originating and receiving signal information transmissions from the station outlets;

said transmitter-receiver connected via said communication modules to the station outlets;

a keyer connected via said communication modules to the station outlets for alternately connecting a ring circuit or a talk circuit therebetween; and a ringer connected via said communication modules to said station outlets for alerting the station desired to be reached.

4. A communications system comprising;

a plurality of channels for conducting signal information;

a plurality of station outlets of various types including a central command station, a communications drop station outlet, a common battery station outlet and a radio station outlet;

means interchangeably connecting each channel to a respective station or station outlet;

communication components including a transmitter-receiver, a keyer and a ringer which are common to and adapted to be connected to all of said types of stations or station outlets;

at least one other communication component which is specific to each type of station or station outlet with each specific component adapted to be connected to only one respective type of station or station outlet;

each of the specific components being packaged into a separate plug-in-module; and a plurality of jacks;

each of said jacks receiving only one module and connecting the common components to a respective channel via said one module;

each jack being capable of receiving any one of the modules;

whereby communications can be effected between any arrangement of various types of stations or station outlets connected to the channels by selectively arranging the modules in their respective jacks corresponding to the station outlets.

References Cited by the Examiner

UNITED STATES PATENTS

| | | | |
|---|---|---|---|
| 2,488,372 | 11/49 | Breisch | 317—101 |
| 2,808,452 | 10/57 | Kennedy et al. | 325—53 |
| 3,031,570 | 4/62 | O'Neil | 325—356 |
| 3,044,046 | 7/62 | Dornhoefer | 317—101 |

FOREIGN PATENTS

| | | |
|---|---|---|
| 486,666 | 6/38 | Great Britain. |

DAVID G. REDINBAUGH, *Primary Examiner.*